United States Patent
Li et al.

(10) Patent No.: US 8,693,474 B2
(45) Date of Patent: Apr. 8, 2014

(54) METHOD FOR RECEIVING MULTI-CAST PACKET

(75) Inventors: Lian-Cheng Li, Tianjin (CN); Chih-Feng Chen, Taipei (TW)

(73) Assignee: Inventec Corporation, Taipei (TW)

( * ) Notice: Subject to any disclaimer, the term of this patent is extended or adjusted under 35 U.S.C. 154(b) by 466 days.

(21) Appl. No.: 12/965,304

(22) Filed: Dec. 10, 2010

(65) Prior Publication Data
US 2012/0147886 A1   Jun. 14, 2012

(51) Int. Cl.
*H04L 12/28* (2006.01)

(52) U.S. Cl.
USPC .......................................... 370/390; 370/412

(58) Field of Classification Search
USPC ........................................................ 370/390
See application file for complete search history.

(56) References Cited

U.S. PATENT DOCUMENTS

| | | | |
|---|---|---|---|
| 6,360,300 B1 * | 3/2002 | Corcoran et al. | 711/139 |
| 6,543,014 B1 * | 4/2003 | Okuyama et al. | 714/712 |
| 6,981,060 B2 * | 12/2005 | Malm | 709/247 |
| 6,985,969 B1 * | 1/2006 | Cheng | 709/250 |
| 7,948,880 B2 * | 5/2011 | Kwan et al. | 370/230 |
| 2009/0182887 A1 * | 7/2009 | Zhang et al. | 139/374 |
| 2010/0014860 A1 * | 1/2010 | Nakagawa | 398/66 |
| 2011/0023106 A1 * | 1/2011 | Murotake et al. | 726/11 |
| 2011/0080837 A1 * | 4/2011 | Kawabata et al. | 370/242 |

* cited by examiner

*Primary Examiner* — Chi Pham
*Assistant Examiner* — Soon-Dong D Hyun
(74) *Attorney, Agent, or Firm* — Morris Manning & Martin LLP; Tim Tingkang Xia, Esq.

(57) ABSTRACT

A receiving method for multi-cast packets includes the steps of creating a plurality of buffer partitions in a memory; for writing the received multi-cast packets that belong to a same data block into the same buffer partition in sequence; decompressing and combining all the multi-cast packets in the completely received buffer partition into the data block that the multi-cast packets belong to, writing the combined data block into a storage device, and emptying the completely received buffer partition, when the multi-cast packets that belong to the data block in any buffer partition are received completely; and transmitting a retransmission request to a transmitting end for any buffer partition that is not empty and in which the multi-cast packets that belong to the data block are not received completely.

6 Claims, 8 Drawing Sheets

METHOD FOR RECEIVING MULTI-CAST PACKET

BACKGROUND OF THE INVENTION

1. Field of Invention

The present invention relates to a method for receiving multi-cast packets, and more particularly to a method for receiving the multi-cast packets in which a retransmission request can be transmitted to a transmitting end.

2. Related Art

Multi-cast is a network technology that permits a multi-cast source to transmit a single packet to a plurality of receivers at the same time. Multi-cast can implement efficient data transmission from a single point to multiple points, so as to save network frequency bandwidth and reduce network load. Therefore, the multi-cast technology is often used in a large-scale data distribution system such as an image file downloading required by computer manufacturers.

The multi-cast technology generally uses user datagram protocol (UDP), but UDP does not perform flow control or error control, so UDP is an unreliable communications protocol. During the process of using the multi-cast technology for large-scale network data transmission, due to influences of factors such as a malfunction of network devices and network overload, as well as an unreliable transmission manner of the multi-cast technology, network packet loss is inevitable. Especially, when network congestion occurs, packet disorder or packet loss might easily occur.

Moreover, the multi-cast technology can support a maximum 64 Kilobyte (KB) packet, so during transmission of large-scale data blocks, the data block needs to be split into a plurality of packets to be transmitted. A receiving end receives the packets and then assembles the packets. During the transmission process, any packet loss causes incompleteness of the data block. In the conventional method, the incomplete data blocks (that is, a received part of the packets) are discarded, and retransmission is then requested. However, in this manner, a data amount transmitted on the network increases and the network load increases, and network congestion further results in a problem of a seriously low transmission success rate.

SUMMARY OF THE INVENTION

In order to solve the above problems, a method for receiving multi-cast packets is provided; and in the method, a plurality of multi-cast packets is received from a transmitting end. The method for receiving the multi-cast packets comprises: a step for creating buffer partitions, for creating a plurality of buffer partitions in a memory; a step for writing the packets into the buffer partitions, for writing at least one received multi-cast packet that belongs to a same data block into the same buffer partition in sequence; a step for writing the data block, for decompressing and combining all the multi-cast packets in the completely received buffer partition into the data block that the multi-cast packets belong to, writing the combined data block into a storage device, and emptying the completely received buffer partition, when the multi-cast packets that belong to the data block in any buffer partition are received completely; and a step for requesting retransmission, for transmitting a retransmission request to the transmitting end for any buffer partition that is not empty and in which the multi-cast packets that belong to the data block are not received completely.

The step for writing the packets into the buffer partitions may further comprise: performing the following steps, when the data block that the received multi-cast packet belongs to does not correspond to any buffer partition: searching for one of the empty buffer partition; and storing the received multi-cast packet into the empty buffer partition.

The step for writing the packet into the buffer partition may also comprise: performing the following steps, when the data block that the received multi-cast packet belongs to does not correspond to any buffer partition, and the empty buffer partition can be not found: using the buffer partition with a longest existing time in the memory as a write partition; writing all the multi-cast packets of the write partition into the storage device; emptying the write partition; and storing the received multi-cast packets into the write partition.

The step of writing all the multi-cast packets of the write partition into the storage device may comprise: performing the following steps, when any multi-cast packet corresponding to the write partition exists in the storage device: decompressing and combining all the multi-cast packets of the data block into the data block, and writing the combined data block into the storage device, when the multi-cast packets that belongs to the data block corresponding to the storage device and the write partition are received completely; and writing all the multi-cast packets of the write partition into the storage device directly, when the multi-cast packets that belongs to the data block corresponding to the storage device and the write partition are not received completely.

The step of writing all the multi-cast packets of the write partition into the storage device may further comprise: writing all the multi-cast packets of the write partition into the storage device directly, when no multi-cast packet corresponding to the write partition exists in the storage device.

According to an embodiment, the step for requesting the retransmission may be executed when a first multi-cast packet of a different data block starts to be received. According to another embodiment, the step for requesting the retransmission may be executed when an existing time of any buffer partition is greater than a buffer time threshold value.

Furthermore, the step for requesting the retransmission may further comprise: transmitting the retransmission request requesting to retransmit all the multi-cast packets of the data block to the transmitting end, when a packet loss ratio of any buffer partition with the existing time greater than the buffer time threshold value is greater than a packet loss threshold value; and transmitting the retransmission request requesting to retransmit at least one multi-cast packet that is incomplete to the transmitting end, when the packet loss ratio is not greater than the packet loss threshold value.

In conclusion, in the method for receiving the multi-cast packets, the space of the memory or the storage device are used to temporarily store the received multi-cast packets, so as to completely receive the disordered multi-cast packets and combine the multi-cast packets back into useful data blocks. As for the lost multi-cast packets, in the method for receiving the multi-cast packets, the transmitting end can also be required to retransmit the needed multi-cast packets according to the packet loss ratio and unnecessary waste of the received data can also be avoided.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

The detailed features and advantages of the present invention are described in detail in the following embodiments. The content is sufficient for any person skilled in the art to understand the technical content of the present invention and implement thereby. Any person skilled in the art can easily understand relevant objectives and advantages of the present invention according to the content disclosed in the specification, the claims, and accompanying drawings.

A method for receiving multi-cast packets is provided, wherein a plurality of multi-cast packets is received from a transmitting end. The transmitting end may use user datagram protocol (UDP) to transmit the plurality of multi-cast packets to a receiving end.

Figure 1:
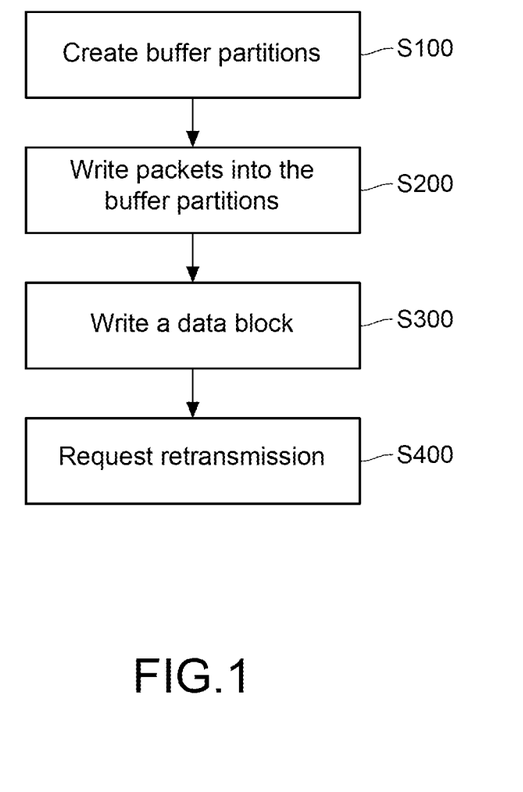
FIG. 1 is a flow chart of a method for receiving multi-cast packets according to an embodiment of the present invention.

FIG. 1 is a flow chart of a method for receiving multi-cast packets according to an embodiment of the present invention. It can be known from FIG. 1 that the method for receiving the multi-cast packets comprises: a step for creating buffer partitions (Step S100); a step for writing the packets into the buffer partitions (Step S200); a step for writing a data block (Step S300); and a step for requesting retransmission (Step S400).

In Step S100, a plurality of buffer partitions is created in a memory of a computer at the receiving end. In Step S200, at least one received multi-cast packet that belongs to a same data block is written into the same buffer partition in sequence. In Step S300, when the multi-cast packets that belong to the data block in any buffer partition are received completely, all the multi-cast packets of the completely received buffer partition are decompressed and combined into the data block that the multi-cast packets belong to, the combined data block is written into a storage device, and the completely received buffer partition is emptied. In Step 400, for any buffer partition that is not empty and in which the multi-cast packets that belong to the data block are not received completely, a retransmission request is transmitted to the transmitting end.

Figure 2:
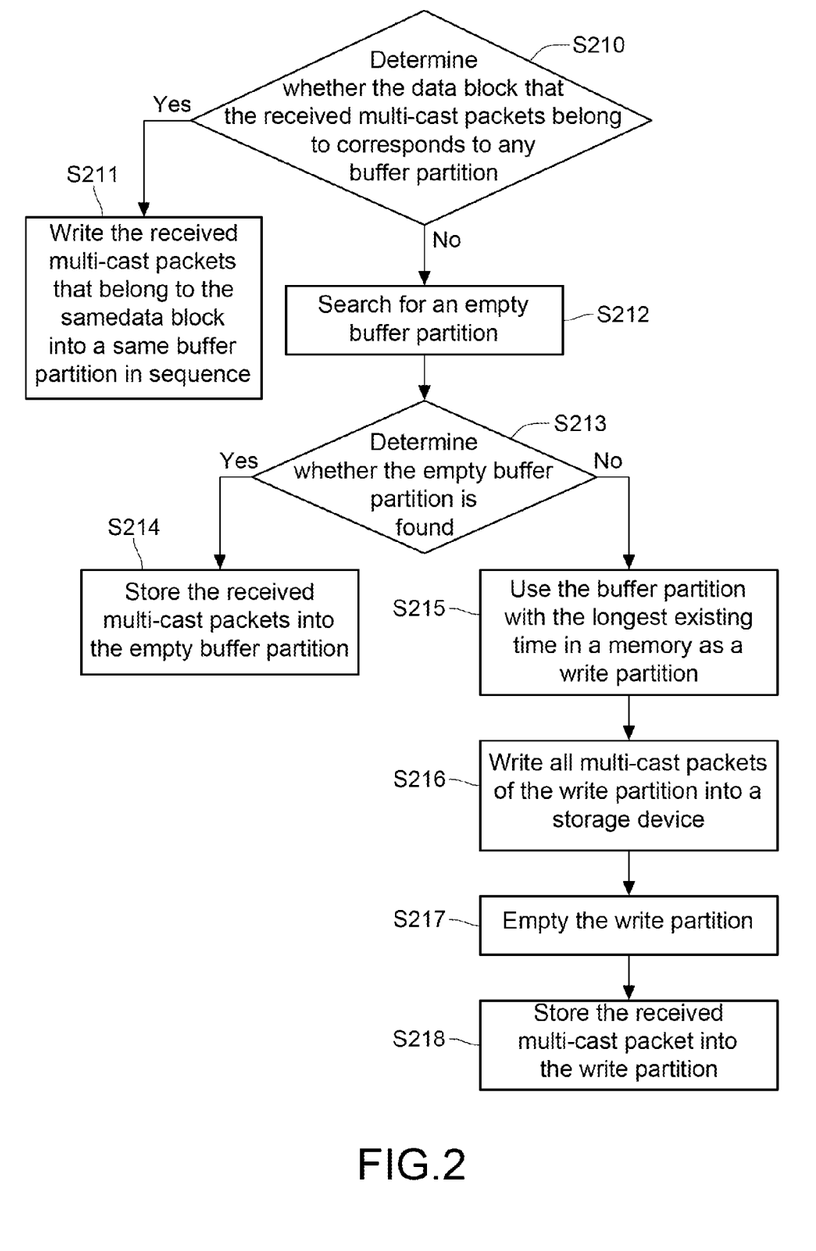
FIG. 2 is a flow chart of Step S200 according to an embodiment of the present invention.
Figure 3:
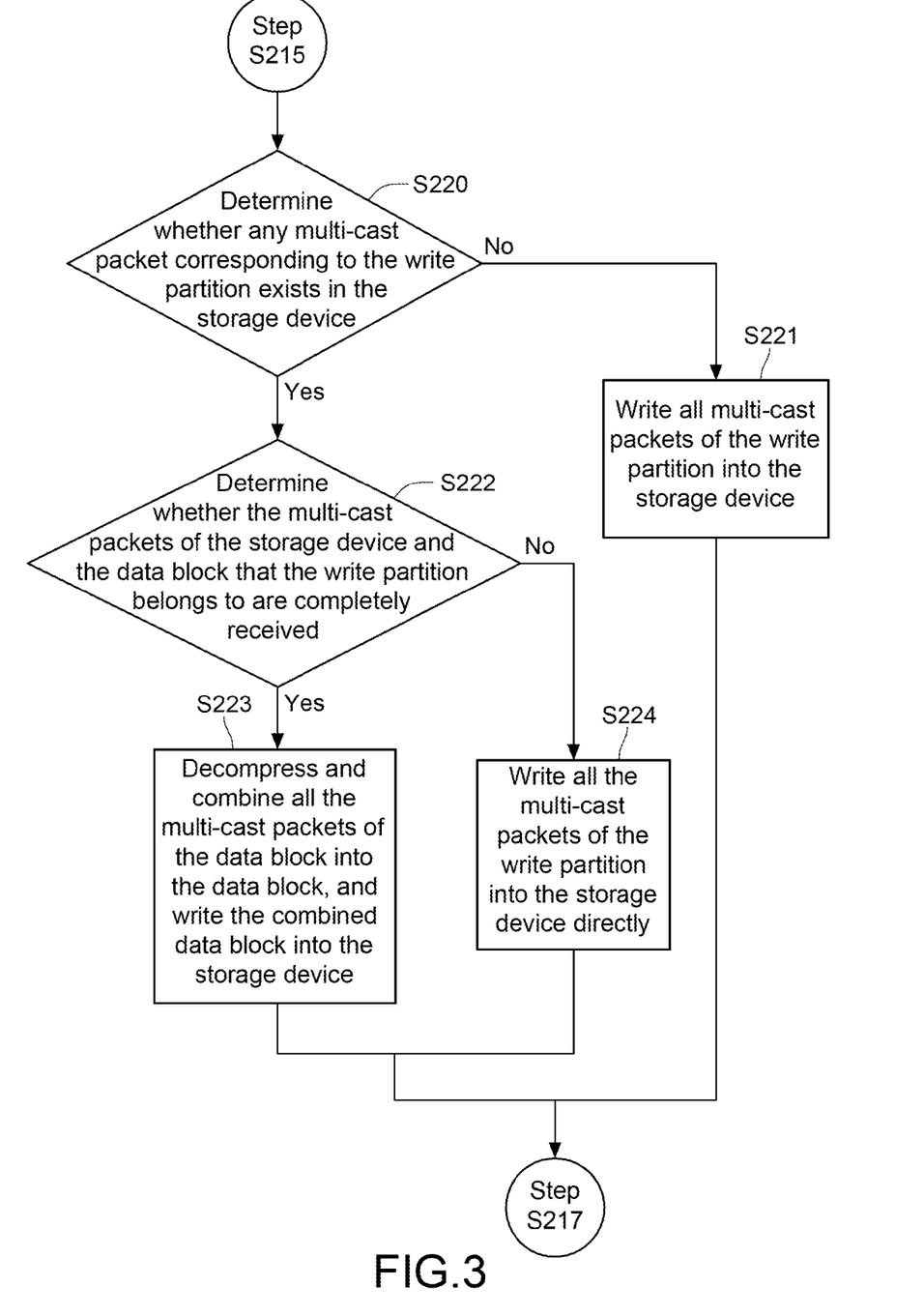
FIG. 3 is a flow chart of Step S216 according to an embodiment of the present invention.

Referring to FIGS. 2 and 3, a process of Step S200 is described in detail below with reference to FIGS. 2 and 3. FIG. 2 is a flow chart of Step S200 according to an embodiment, and FIG. 3 is a flow chart of Step S216 in FIG. 2.

The receiving end can first determine whether one data block that the received multi-cast packet belongs to corresponds to any buffer partition (Step S210). The data block that the received multi-cast packet belongs to corresponds to one of the buffer partitions, indicating that multi-cast packets corresponding to the same data block are received before. Therefore, the received multi-cast packet that belongs to the same data block is written into the same buffer partition in sequence (Step S211). After Step S211, it can be determined whether all the multi-cast packets of the corresponding data block are received completely, and then Step S300 is performed according to the determination result.

When the data block that the received multi-cast packet belongs to does not correspond to any buffer partition, the empty buffer partition can be searched for first (Step S210); and then it is determined whether the empty buffer partition can be found (Step S213). If the empty buffer partition exists in the memory, the received multi-cast packet is stored into the empty buffer partition (Step S214).

If the empty buffer partition can not be found, the buffer partition with a longest existing time in the memory can be used as a write partition (Step S215), and then all the multi-cast packets of the write partition are written into the storage device (Step S216). The storage device may be a hard disk or a virtual memory of the computer at the receiving end. When the data of the multi-cast packets of the write partition is backed up in the storage device, the write partition is emptied (Step S217), and then a newly received multi-cast packet is stored in the write partition (Step S218).

That is to say, in the method for receiving the multi-cast packets, the existing time of each buffer partition may be recorded. When the memory is insufficient, the data in the buffer partition can be migrated into the storage device in a first in first out (FIFO) manner, and then the newly received data is stored in the memory.

In an embodiment, Step S216 of writing all the multi-cast packets of the write partition into the storage device further comprises a plurality of steps in FIG. 3.

Before the data is written into the storage device, it is first determined whether any multi-cast packet corresponding to the write partition exists in the storage device (Step S220). That is to say, it is determined whether one of the multi-cast packets corresponding to the same data block has been written into the storage device before. When no multi-cast packet corresponding to the write partition exists in the storage device, all the multi-cast packets of the write partition can be directly written into the storage device (Step S221). It should be noted that these non-decompressed multi-cast packets are temporarily stored in the storage device at this time. In order to avoid influences on other data in the storage device, these multi-cast packets may be written into a preset position of storing the data block that these multi-cast packets correspond to in the storage device at this time.

When any multi-cast packet corresponding to the write partition exists in the storage device, it is determined whether the multi-cast packets of the storage device and the data block that the write partition belongs to are received completely (Step S222). If the multi-cast packets are all received completely, all the multi-cast packets of the data block can be decompressed and combined into the data block, and the combined data block is written into the storage device (Step S223). At this time, the receiving end reads the multi-cast packets temporarily stored in the storage device and the buffer partition respectively, combines the multi-cast packets into the complete data block, and then uses the data block to cover the previous multi-cast packets temporarily stored in the storage device. Specifically, after all the read multi-cast packets are combined, the multi-cast packets are then decompressed to obtain the complete data block. On the contrary, if the multi-cast packets of the storage device and the data block that the write partition belongs to are not received completely; all the multi-cast packets of the write partition can be directly written into the storage device (Step S224).

According to the above process flow, in the method for receiving the multi-cast packets, a conventional problem of packet disorder can be effectively solved through a double buffer mechanism of the memory and the storage device.

Figure 4:
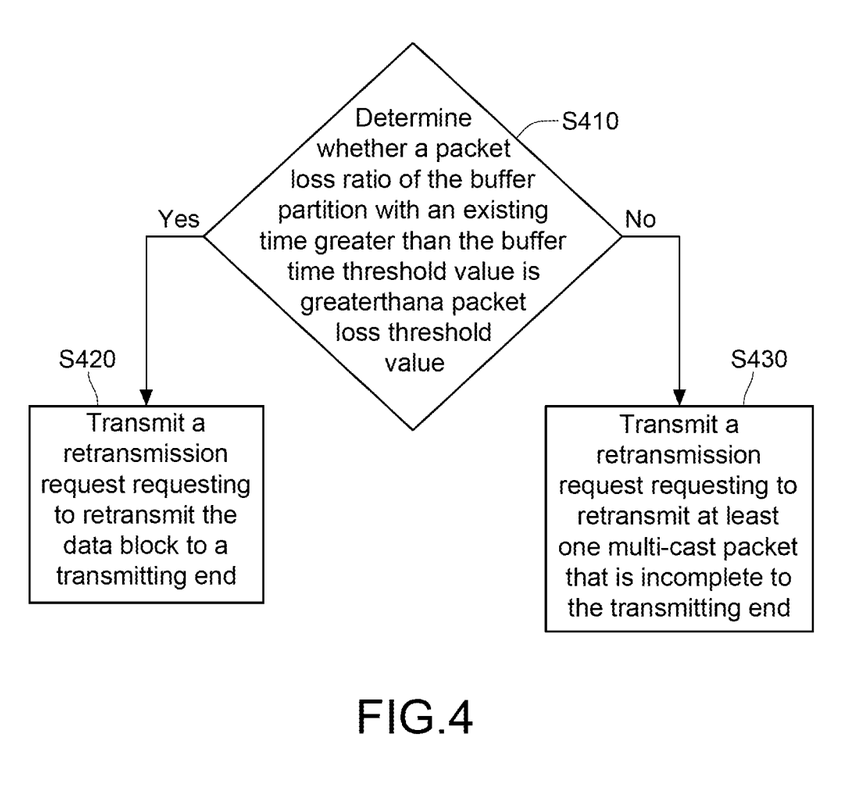
FIG. 4 is a flow chart of Step S400 according to an embodiment of the present invention.

Furthermore, in the method for receiving multi-cast packets, a conventional problem of packet loss can also be solved through Step S400. According to an embodiment, Step 400 of requesting the retransmission may be implemented when the first multi-cast packet of the different data block starts to be received. According to another embodiment, Step 400 of requesting the retransmission may be implemented when the existing time of any buffer partition is greater than a buffer time threshold value. In other words, in Step S400, when data of the buffer partition needs to be written into the storage device, it is determined whether the retransmission request needs to be made to the transmitting end.

FIG. 4 is a flow chart of Step S400 according to an embodiment.

The receiving end may determine whether a packet loss ratio of any buffer partition with the existing time greater than the buffer time threshold value is greater than a packet loss threshold value (Step S410). The packet loss ratio may be obtained by subtracting a ratio between the number of the multi-cast packets stored in the buffer partition during processing and the number of all multi-cast packets of the data block corresponding to the buffer partition from 1. For example, if one data block is segmented into 100 multi-cast packets to be transmitted, and the receiving end only receives 90 multi-cast packets so far, so the packet loss ratio is 1-90/100=10%.

When the packet loss ratio is greater than the packet loss threshold value, the receiving end can transmit the retransmission request requesting to retransmit all the multi-cast packets of the data block to the transmitting end (Step S420). When the packet loss ratio is not greater than the packet loss threshold value, the retransmission request requesting to retransmit at least one multi-cast packet that is incomplete can be transmitted to the transmitting end (Step S420). That is to say, when the packet loss ratio is not large, the transmitting end can be required to retransmit the lost multi-cast packets only. However, if the packet loss ratio is large, the transmitting end can be required to retransmit the whole data block directly, so as to prevent additional parts such as headers of multi-cast packets from causing too heavy load on the network and the transmitting end.

Practical examples are illustrated below with reference to FIGS. 5 to 8.

Figure 5A:
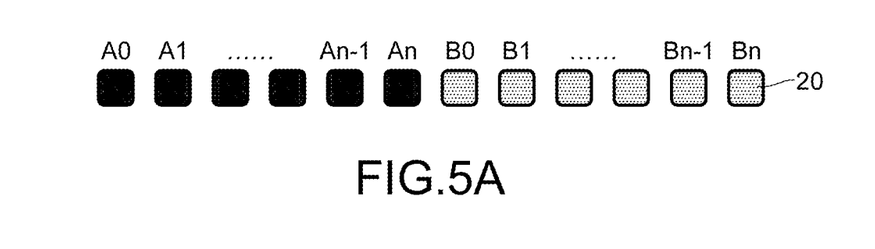
FIG. 5A is a schematic view of multi-cast packets according to an embodiment of the present invention.
Figure 5B:
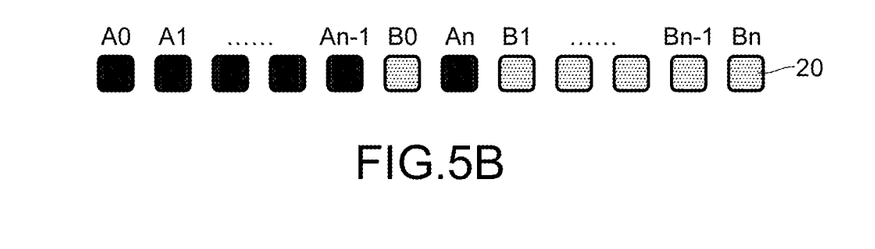
FIG. 5B is a schematic view of multi-cast packets according to an embodiment of the present invention.
Figure 5C:
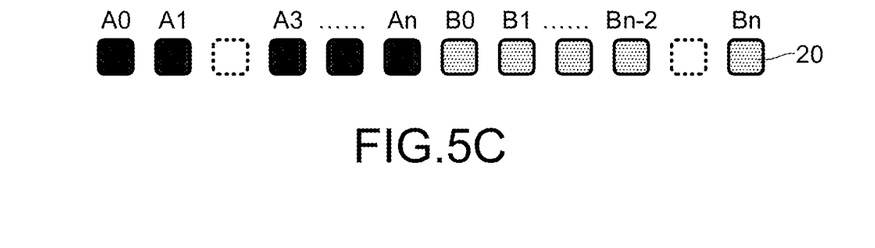
FIG. 5C is a schematic view of multi-cast packets according to an embodiment of the present invention.

FIGS. 5A, 5B, and 5C are schematic views of multi-cast packets when reception is normal, packet disorder occurs, and packet loss occurs respectively. It is assumed that multi-cast packets 20 such as A0, A1, and An correspond to the data block (referred to as a data block A hereinafter), and multi-cast packets 20 such as B0, B1, and Bn correspond to another data block (referred to as data block B hereinafter). FIG. 5B is a situation when disorder occurs to the multi-cast packets 20 An and B1, while in FIG. 5C the multi-cast packets 20 A2 and Bn-1 are lost.

Figure 6:
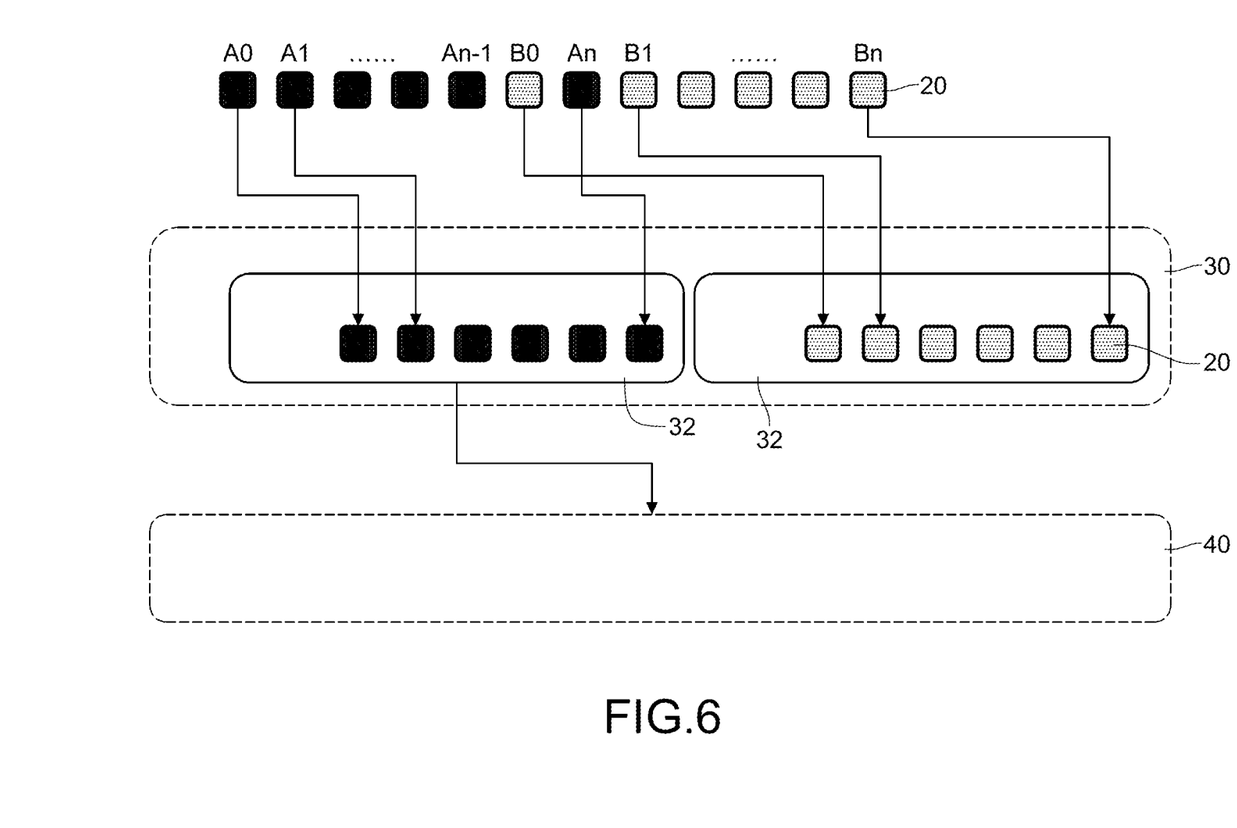
FIG. 6 is a schematic view of multi-cast packets according to an embodiment of the present invention.

As shown in FIG. 6, for the disorder situation, the receiving end can store the multi-cast packets 20 corresponding to the data blocks A and B into corresponding buffer partitions 32, respectively. When the buffer partition 32 completely receives the corresponding multi-cast packets 20, Step S300 can be performed to decompress and combine the multi-cast packets 20 into the data block, and then write the data block into the storage device 40. Even in a more complicated example as shown in FIG. 7, a disorder problem is solved through the plurality of buffer partitions 32.

Figure 7:
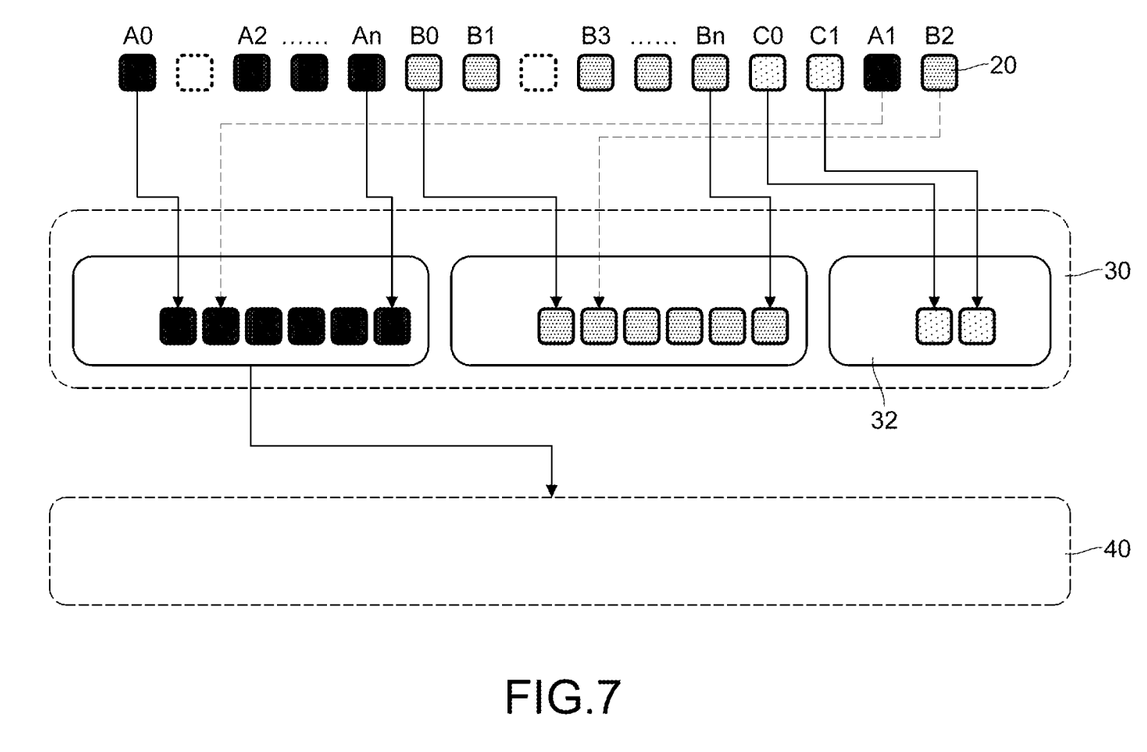
FIG. 7 is a schematic view of multi-cast packets according to an embodiment of the present invention.

In FIG. 7, the multi-cast packets 20 A1 and B2 are lost. As the packet loss ratio is small, the transmitting end can be requested to retransmit the two lost multi-cast packets 20 only. The retransmitted A1 and B2 are written into the corresponding buffer partitions 32 according to the method for receiving the multi-cast packets. The buffer partition 32 corresponding A1 thus completely receives all the multi-cast packets 20 corresponding to the data block A, and stores the data block A into the storage device 40.

Figure 8:
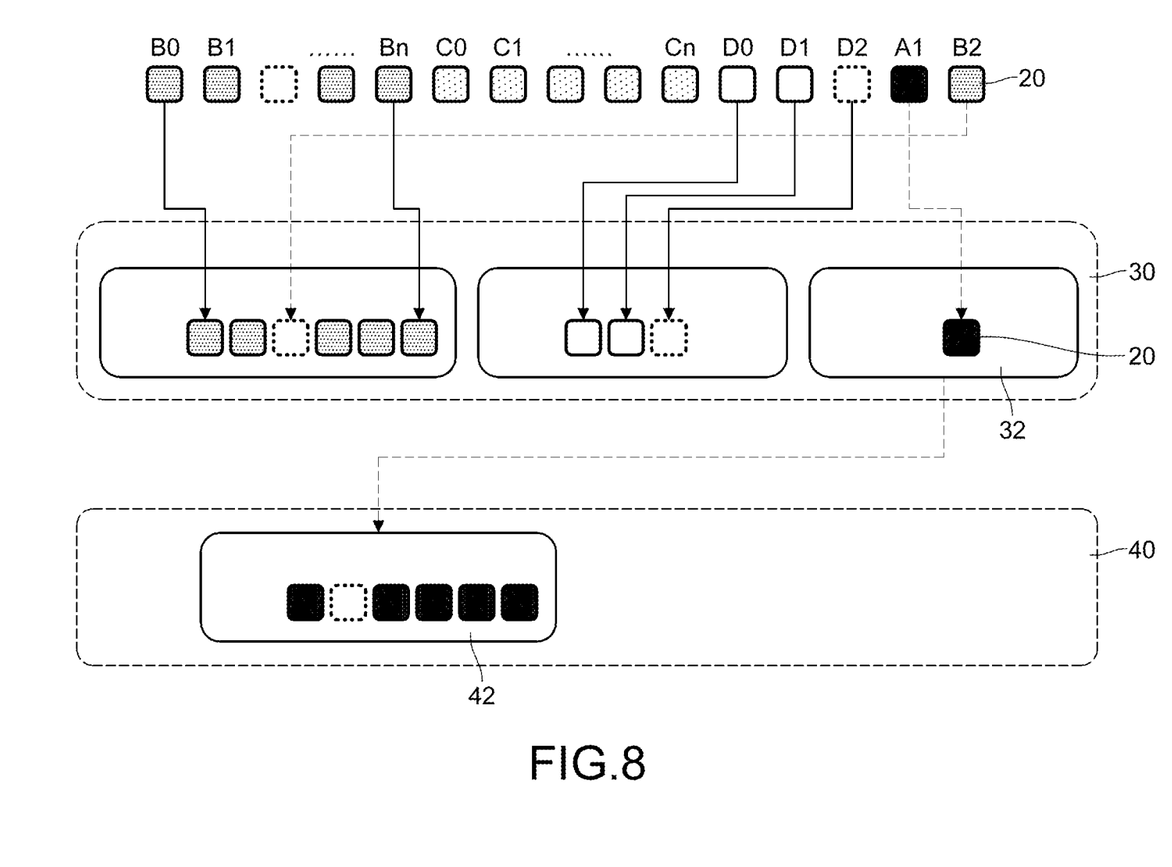
FIG. 8 is a schematic view of multi-cast packets according to an embodiment of the present invention.

Refer to an embodiment as shown in FIG. 8. When the multi-cast packet 20 D0 is received, as the space of the memory 30 is insufficient, the receiving end directly writes the data of the buffer partition 32 that the data block A corresponds to into a temporary storage space 42 of the storage device according to the FIFO principle. As discussed above, at this time, these non-decompressed multi-cast packets 20 are only temporarily stored, and these multi-cast packets 20 are written into preset positions of storing the data block A in the storage device 40.

The multi-cast packets 20 D0 and D1 can be written into the emptied buffer space 32. When the receiving end finds that the A1 (retransmitted by the transmitting end) in the buffer space 32 and other multi-cast packets 20 stored in the temporary storage space 42 of the storage device are complete, these multi-cast packets 20 temporarily stored in the storage device 40 and the buffer partition 32 can be read, compressed and combined into the data block A, and then the data block A covers previous data temporarily stored in the temporary storage space 42 of the storage device.

In conclusion, in the method for receiving the multi-cast packets, a high-speed processing capacity of the memory can be used to buffer an incomplete data block (that is, multi-cast packets that are received incompletely), so as to effectively solve a problem of false packet loss caused by packet reception disorder, and not to influence a data transmission speed. Also, in the method of using the high capacity of the storage device to temporarily store the incomplete data, a situation of large-amount packet loss due to a poor network condition can be solved, so as to increase a transmission success rate of the multi-cast packets. Furthermore, through a retransmission mechanism requesting to retransmit the whole data block or the lost multi-cast packets in a mode such as the packet loss ratio, the method for receiving the multi-cast packets can reduce network traffic, increase transmission efficiency, and reduce the network load.

What is claimed is:

1. A method for receiving multi-cast packets, used for receiving a plurality of multi-cast packets from a transmitting end, and the method comprising:

creating a plurality of buffer partitions in a memory;

writing at least one of the received multi-cast packet that belongs to a same data block into the same buffer partition in sequence;

when all the multi-cast packets that belong to the data block in any buffer partition are received, decompressing and combining all the multi-cast packets in the buffer partition into the data block that the multi-cast packets belong to, writing the combined data block into a storage device, and emptying the buffer partition; and transmitting a retransmission request to the transmitting end for any buffer partition that is not empty and the multi-cast packets that belong to the data block are not all received.

2. The method for receiving the multi-cast packets according to claim 1, wherein the step for writing the packets into the buffer partitions further comprises:

performing the following steps when the data block that the received multi-cast packet belongs to does not correspond to any buffer partition:

searching for one of the empty buffer partition; and storing the received multi-cast packet into the empty buffer partition.

3. The method for receiving the multi-cast packets according to claim 2, wherein the step for writing the packets into the buffer partitions further comprises:

performing the following steps when the data block that the received multi-cast packet belongs to does not correspond to any buffer partition, and the empty buffer partition can not be found:

using the buffer partition with a longest existing time in the memory as a write partition;

writing all the multi-cast packets of the write partition into the storage device;

emptying the write partition; and storing the received multi-cast packets into the write partition.

4. The method for receiving the multi-cast packets according to claim 3, wherein the step of writing all the multi-cast packets of the write partition into the storage device comprises:

performing the following steps when any multi-cast packet corresponding to the write partition exists in the storage device:

when the multi-cast packets that belong to the data block corresponding to the storage device and the write partition are all received, decompressing and combining all the multi-cast packets of the data block into the data block, and writing the combined data block into the storage device; and writing all the multi-cast packets of the write partition into the storage device, when the multi-cast packets that belongs to the data block corresponding to the storage device and the write partition are not all received.

5. The method for receiving the multi-cast packets according to claim 4, wherein the step of writing all the multi-cast packets of the write partition into the storage device further comprises:

writing all the multi-cast packets of the write partition into the storage device, when no multi-cast packet corresponding to the write partition exists in the storage device.

6. The method for receiving the multi-cast packets according to claim 1, wherein the step for requesting the retransmission is executed when the first multi-cast packet of the different data block starts to be received.

\* \* \* \* \*